United States Patent
Zabel et al.

(10) Patent No.: US 10,739,192 B1
(45) Date of Patent: Aug. 11, 2020

(54) ULTRAVIOLET FLAME SENSOR WITH DYNAMIC EXCITATION VOLTAGE GENERATION

(71) Applicant: Honeywell International Inc., Morris Plains, NJ (US)

(72) Inventors: Brian Zabel, Yorktown, IN (US); Chad Carty, Nioblesville, IN (US); Aaron Daniels, Greenfield, IN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/373,233

(22) Filed: Apr. 2, 2019

(51) Int. Cl.
*G01J 1/42* (2006.01)
*G01J 1/44* (2006.01)

(52) U.S. Cl.
CPC .............. *G01J 1/429* (2013.01); *G01J 1/44* (2013.01); *G01J 2001/4406* (2013.01)

(58) Field of Classification Search
CPC .................................... G01J 1/429; G01J 1/44
See application file for complete search history.

(56) References Cited

U.S. PATENT DOCUMENTS

| | | |
|---|---|---|
| 3,683,372 A | 8/1972 | Horn |
| 4,202,318 A | 5/1980 | DePodesta et al. |
| 4,280,184 A | 7/1981 | Weiner et al. |
| 4,578,583 A | 3/1986 | Ciammaichella et al. |
| 4,823,114 A | 4/1989 | Gotisar |
| 4,882,573 A | 11/1989 | Leonard et al. |
| 5,123,836 A | 6/1992 | Yoneda et al. |
| 5,194,728 A | 3/1993 | Peterson |
| 5,256,057 A | 10/1993 | Grow |
| 6,168,419 B1 | 1/2001 | Mindermann |
| 6,261,086 B1 | 7/2001 | Fu |
| 6,404,342 B1 | 6/2002 | Planer et al. |
| 6,472,669 B1 | 10/2002 | Chase et al. |
| 6,515,283 B1 | 2/2003 | Castleman et al. |
| 7,088,253 B2 | 8/2006 | Grow |
| 7,244,946 B2 | 7/2007 | Burnette et al. |
| 7,468,515 B2 | 12/2008 | Cole et al. |

(Continued)

FOREIGN PATENT DOCUMENTS

| | | |
|---|---|---|
| CN | 202748907 U | 2/2013 |
| JP | 2012255729 A | 12/2012 |

OTHER PUBLICATIONS

Kshitij Shinghal. Intelligent Multi Sensor System for Agricultural Fire Detection. MIT International Journal of Electronics and Communication Engineering. Jan. 2014, pp. 7-11, vol. 4, No. 1.

(Continued)

*Primary Examiner* — Kiho Kim (57) ABSTRACT

A controller unit for controlling an ultraviolet (UV) sensor may be excited by an excitation voltage that enables the UV sensor to detect incoming UV light. The UV sensor may provide UV detection events that may be related to the intensity of the incoming UV light. The control unit may include an excitation voltage generator, an event detector, and a controller configured to cause the excitation voltage generator to produce an excitation voltage for a cumulative excitation time that is less than 50% of the time, which may significantly increase the operational lifetime and/or reliability of a UV sensor.

18 Claims, 10 Drawing Sheets

(56) References Cited

U.S. PATENT DOCUMENTS

| | | |
|---|---|---|
| 7,806,682 B2 | 10/2010 | Cueva |
| 7,893,615 B2 | 2/2011 | Cole |
| 8,310,801 B2 | 11/2012 | McDonald et al. |
| 8,371,102 B1 | 2/2013 | Lee et al. |
| 8,516,895 B2 | 8/2013 | Verner et al. |
| 9,417,124 B1 | 8/2016 | Zabel et al. |
| 9,863,990 B2 | 1/2018 | Zabel et al. |
| 9,976,896 B2 | 5/2018 | Zabel et al. |
| 10,181,244 B1 | 1/2019 | Grady et al. |
| 2003/0141979 A1 | 7/2003 | Wild et al. |
| 2003/0143503 A1 | 7/2003 | Wild et al. |
| 2005/0174244 A1 | 8/2005 | Grow |
| 2005/0247883 A1* | 11/2005 | Burnette ............... G01J 1/429 250/372 |
| 2006/0049361 A1 | 3/2006 | Allsworth et al. |
| 2007/0019361 A1 | 1/2007 | Obrecht |
| 2009/0059159 A1* | 3/2009 | Howell ............... G02C 5/001 351/41 |
| 2009/0072737 A1 | 3/2009 | Cole |
| 2009/0120338 A1 | 5/2009 | Adendorff et al. |
| 2010/0013644 A1 | 1/2010 | McDonald et al. |
| 2012/0138809 A1 | 6/2012 | Mindermann et al. |
| 2016/0334271 A1 | 11/2016 | Zabel et al. |
| 2016/0334453 A1* | 11/2016 | Zabel ..................... F23N 5/082 |
| 2017/0025259 A1* | 1/2017 | Ramachers ........... H01J 43/045 |
| 2017/0074722 A1* | 3/2017 | Zhang .................... G01J 1/429 |
| 2019/0017865 A1 | 1/2019 | Barcelos |
| 2019/0019389 A1 | 1/2019 | Grady et al. |

OTHER PUBLICATIONS

Scot Lester. Flash-capacitor IC Powers Portable UV Flame Detector. EE Times. Jul. 21, 2006. 4 pages.

* cited by examiner

ULTRAVIOLET FLAME SENSOR WITH DYNAMIC EXCITATION VOLTAGE GENERATION

TECHNICAL FIELD

The disclosure relates generally to ultraviolet (UV) sensors, and more particularly to UV sensors for use in combustion appliances.

BACKGROUND

Ultraviolet (UV) sensors are designed to detect the presence of UV radiation. For example, UV sensors may be utilized to detect the presence of radiation in the spectral range of approximately 10 nm to 400 nm. Such UV sensors may be useful in many different product applications. For example, UV sensors may be useful in detecting the presence of a flame in a burner of a combustion appliance. Detecting the presence of a flame inside a burner can help safely operate the burner. For instance, if no flame is present in the burner, the burner may be shut down to help prevent unburned fuel from accumulating inside of the burner.

To activate the UV sensor, a relatively high excitation voltage must typically be applied. While the excitation voltage causes the UV sensor to become active, it also causes the UV sensor to degrade over time. As such, the less time the excitation voltage is applied, the longer the UV sensor will last. At the same time, the less time that the excitation voltage is applied to the UV sensor, the less time the UV sensor is actively monitoring the flame of a burner. What would be desirable is a technique to obtain sufficiently accurate readings of the flame while extending the expected life of the UV sensor.

SUMMARY

This disclosure relates generally to ultraviolet (UV) sensors, and more particularly to UV sensors for use in combustion appliances. For example, to obtain sufficiently accurate readings of a flame while extending the expected life of the UV sensor, the time that the excitation voltage is applied to the UV sensor is dynamically adjusted depending on the intensity of the incoming UV radiation from the flame. This is one example.

In one example, a method for controlling an ultraviolet (UV) sensor includes activating the UV sensor in accordance with a duty cycle to detect incoming UV radiation during each cycle of the duty cycle. A measure related to an intensity of the incoming UV radiation is then determined based on the detected incoming UV radiation. The duty cycle is then dynamically adjusted based at least in part on the determined intensity of the incoming UV radiation. In some cases, the duty cycle is reduced causing the UV sensor to be activated less often when the intensity of the incoming UV radiation is higher than when the intensity of the incoming UV radiation is lower.

In another example, a controller unit for controlling an ultraviolet (UV) sensor may be configured to provide an excitation voltage that enables the UV sensor to detect incoming UV light. The UV sensor may provide a plurality of UV detection events. A rate of the number of UV detection events may be related to the intensity of the incoming UV light. The controller unit may include an excitation voltage generator that is configured to selectively produce the excitation voltage, an event detector for detecting UV detection events when the excitation voltage generator is producing the excitation voltage, and a controller operatively coupled to the excitation voltage generator and the event detector. The controller may be configured to cause the excitation voltage generator to produce an excitation voltage for a cumulative excitation time that is less than 50% over at least one second, determine a measure related to the intensity of the incoming UV light based on the UV detection events detected by the event detector when the excitation voltage is producing the excitation voltage, and output the measure related to the intensity of the incoming UV light. In some cases, the controller may be configured to cause the excitation voltage generator to produce the excitation voltage for a cumulative excitation time that is based on the intensity of the incoming UV light.

In some cases, the controller may be configured to count a predetermined number of the UV detection events detected by the event detector, wherein the predetermined number is greater than one, determine how long it took to count the predetermined number of the UV detection events, and after the predetermined number of the UV detection events have been counted, enforce a down time where the excitation voltage generator does not produce an excitation voltage sufficient to detect incoming UV light. The down time may be dependent on the how long it took to count the predetermined number of the UV detection events. In some cases, the down time is shorter when the time it took to count the predetermined number of the UV detection events is longer. In some cases, the controller may repeat this a plurality of times.

In some cases, the controller may be configured to count the UV detection events detected by the event detector over a predetermined time, and after the predetermined time expires, enforce a down time where the excitation voltage generator does not produce an excitation voltage sufficient to detect incoming UV light. In some cases, the controller may repeat this a plurality of times.

In another example, a method for controlling an ultraviolet (UV) sensor such that the UV sensor may be excited by an excitation voltage that enables the UV sensor to detect incoming UV light. The UV sensor may provide a plurality of UV detection events and a rate of the number of UV detection events may be related to the intensity of the incoming UV light. The illustrative method may include producing an excitation voltage for a cumulative excitation time that is less than 30% over at least 0.5 seconds, detecting UV detection events when the excitation voltage is produced, determining a measure related to the intensity of the incoming UV light based on the UV detection events, and outputting the measure related to the intensity of the incoming UV light. In some cases, the cumulative excitation time may be based on the intensity of the incoming UV light.

In another example, a method for controlling an ultraviolet (UV) sensor may include activating the UV sensor in accordance with a duty cycle to detect incoming UV radiation during each cycle of the duty cycle, determining a measure related to an intensity of the incoming UV radiation based on the detected incoming UV radiation, and dynamically adjusting the duty cycle based at least in part on the determined intensity of the incoming UV radiation.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure.

Some examples of the present disclosure may be found in controllers, systems, methods, and/or a non-transitory computer-readable storage medium with an executable program stored thereon for dynamically adjusting operation of sensor (s) while maintaining an accurate measurement of critical parameters of a building automation system (BAS). In some cases, the sensors may be configured to detect light produced by a flame of a fuel burner and determine an intensity of the light. In some instances, the intensity of the light may be directly related to a strength of the flame itself. As such, this disclosure describes controllers, systems, methods, and executable programs that produce sensors capable of tailoring their monitoring schedule in relation to changes in the flame under detection and/or changes to the sensors themselves.

Fuel burners such as those found in water heaters, furnaces, boilers, etc. must have some sort of flame sensor for safe operation. The danger resulting from fuel flowing into a combustion space without presence of a flame to burn the fuel is well known. Fuel burners may, therefore, utilize a flame sensor in a fuel valve control to enable opening of a fuel valve in the presence of a flame or conversely, to close the fuel valve in the absence of a flame. Combustion of hydrocarbon fuels produce flames that emit ultraviolet (UV) radiation/light (e.g., light roughly between 10 nm and 400 nm). As such, in some cases, the fuel sensor may be a UV sensor.

Figure 1:
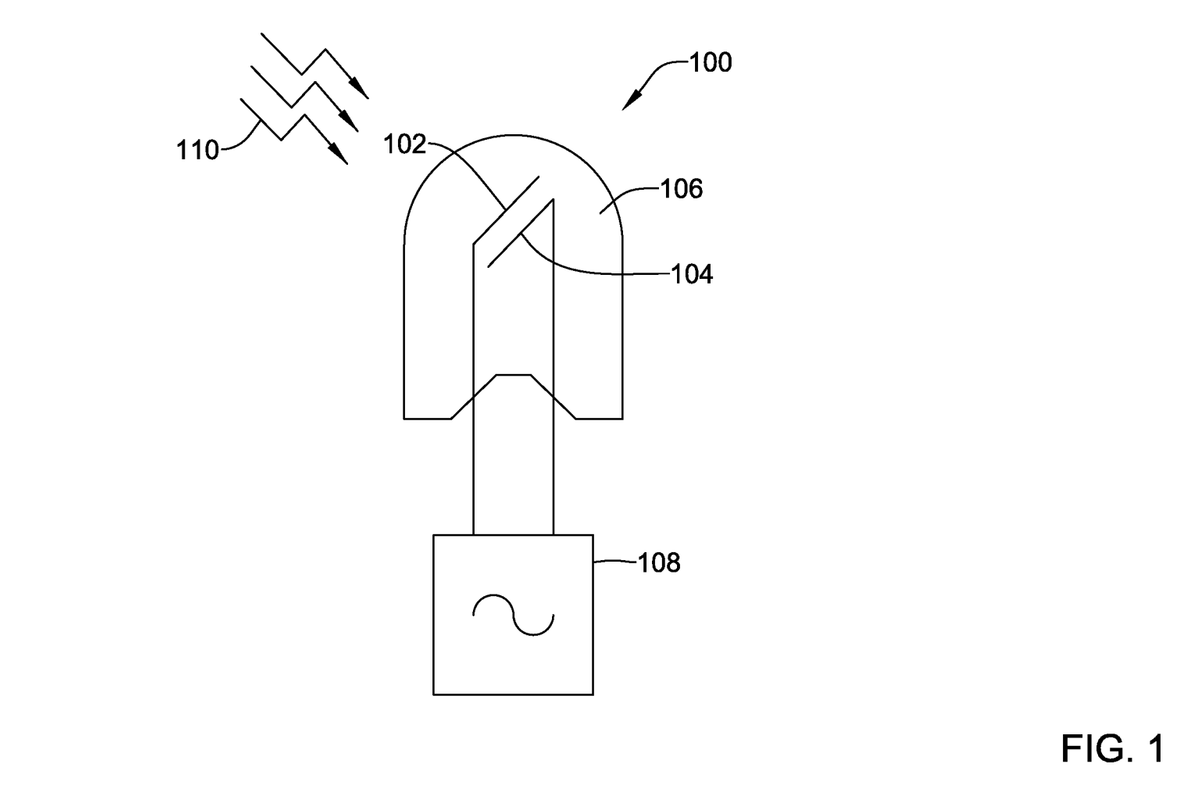
FIG. 1 is a schematic view of an illustrative ultraviolet (UV) sensor.

FIG. 1 is a schematic view of an illustrative ultraviolet (UV) sensor 100. In some cases, the UV sensor 100 may be a gas discharge tube type UV sensor. The UV sensor 100 may include a pair of electrodes, including a cathode 102 and an anode 104, and a gas filled chamber 106. The cathode 102 and the anode 104 of the UV sensor 100 may be driven by an excitation voltage provided by an excitation voltage generator 108. In some cases, the excitation voltage generator 108 may charge the cathode 102 and the anode 104 to an excitation voltage. The excitation voltage may be, for example, between 0 and 12 volts DC, between 2 and 6 volts DC, between 3 and 5 volts DC, upwards of 100 volts or 300 volts or more, or any other suitable voltage.

When UV light 110, such as that emitted by a flame of a burner of a combustion appliance, is transmitted through the gas filled chamber 106, the incident energy can cause emission of surface electrons from the cathode 102 into the gas. The electrons are then accelerated by the electric field between the negatively charged cathode 102 to the positively charged anode 104. These electrons collide with molecules of the gas, generating both negative electrons and positive ions. The electrons are attracted to the anode 104 and the ions are attracted to the cathode 102, generating secondary avalanche electrons. With UV light 110 of a sufficient intensity, a gas discharge current may flow between the cathode 102 and the anode 104 (sometimes referred to as a conduction event), which reduces the excitation voltage between the cathode 102 and the anode 104. When the excitation voltage between the cathode 102 and the anode 104 is reduced, a conduction event can be detected and the UV sensor 100 may send a pulse signal. In some cases, the voltage between the electrodes 102 and 104 may be quenched before the excitation voltage is again applied. When more intense UV light 110 is present, the conduction event will tend to occur sooner after the quench than when the UV light 110 is less intense. Thus, in some cases, the UV sensor 100 may produce a series of pulse signals, where the frequency of the pulse signals is related to the intensity of the UV light 110 emitted from a flame.

Figure 2:
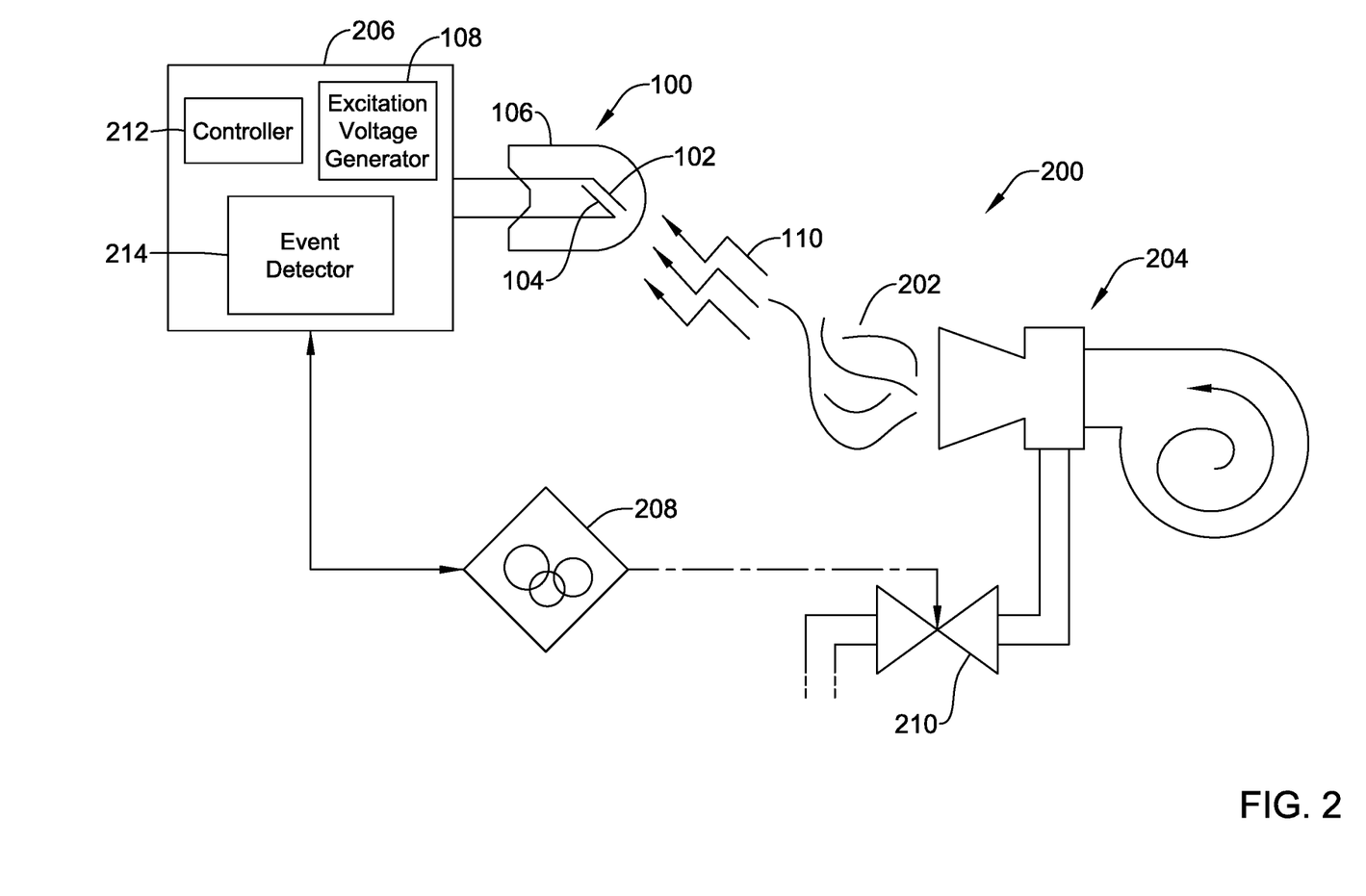
FIG. 2 is a schematic view of an illustrative combustion appliance that uses the illustrative ultraviolet (UV) sensor of FIG. 1.

FIG. 2 is a schematic view of an illustrative combustion appliance 200. The combustion appliance includes the UV sensor 100 for monitoring the presence of a flame 202 of a burner 204. The combustion appliance 200 may further include a controller unit 206, a burner management system 208, and a gas valve 210. In some cases, the burner 204 can be a fuel-air or fuel-oxygen burner to produce (e.g. generate) the flame 202. For example, burner 204 can be used to produce flame 202, which is used to generate heat for use in residential and/or commercial furnaces, hot water boilers, water heaters, and/or any other suitable application.

In some cases, the controller unit 206 may be operatively coupled to the UV sensor 100. The controller unit 206 may include an excitation voltage generator 108, a controller 212, and an event detector 214. In operation, an excitation voltage may be applied between the cathode 102 and the anode 104 by the excitation voltage generator 108. The UV sensor 100 may be positioned to be exposed to the UV light 110 emitted by the flame 202. Similar to FIG. 1, the UV light 110 may eventually cause a gas discharge current (i.e. conduction event) to flow between the cathode 102 and the anode 104 that may be detected by the event detector 214. After a conduction event, the excitation voltage generator 108 may have to refresh the excitation voltage provided to the UV sensor 100, sometimes following a quench, to compensate for any reduction in voltage caused by the conduction event. In some cases, the event detector 214 may send a pulse signal to the controller 212 in response to a detected conduction event.

In some instances, the controller 212 may be configured to determine a cumulative excitation time. In some cases, the cumulative excitation time may be based on the intensity of the UV light 110. For instance, the cumulative excitation time may be longer when the intensity of the incoming UV light 110 is lower than when the intensity of the incoming UV light 110 is higher. In some examples, the cumulative excitation time may be the sum total time during which the controller unit 206 is actively monitoring the flame 202. That is, during the cumulative excitation time, the controller 212 may cause the excitation voltage generator 108 to produce the excitation voltage for the UV sensor 100 allowing the event detector 214 to provide the detected event pulse signals to the controller 212. Accordingly, the controller 212 may then use the detected event pulse signals to determine a measure related to the intensity of the UV light 110. As such, examples of the controller unit 206 described herein may operate similar to a control system where the measure related to the intensity of the UV light 110 may be used to determine a duration of the cumulative excitation time and the event pulse signals (i.e., the detected events) may be fed back to the controller 212 to determine a new measure related to the intensity of the UV light 110.

In some cases, an output of the measure related to the intensity of the UV light may be used to control operation of the burner 204. For instance, the gas valve 210 can be opened to supply gas to the burner 204 during a call for heat. As such, during a call for heat, if the programmable controller 206 produces an output measurement that the UV sensor 100 does not detect the presence of flame 202, the burner management system 208 may turn off the gas valve 210 to help prevent the buildup of unburnt fuel in the burner 204. In some cases, if the health of the UV sensor 100 is determined to be decreasing or unacceptable by the programmable controller 206, the burner management system 208 may also turn off the gas valve 210 and extinguish any flame 202 until the UV sensor 100 can be serviced. In some cases, the burner management system 208 can control various aspects of the operation of burner 204, including initial ignition of the burner 204 in response to a call for heat, and the termination of the burner at the end of the call for heat. In some cases, the burner management system 208 may change the firing rate of the burner 204 based on the output measurement to produce a more intense flame 202 or a less intense flame 202.

Figure 3:
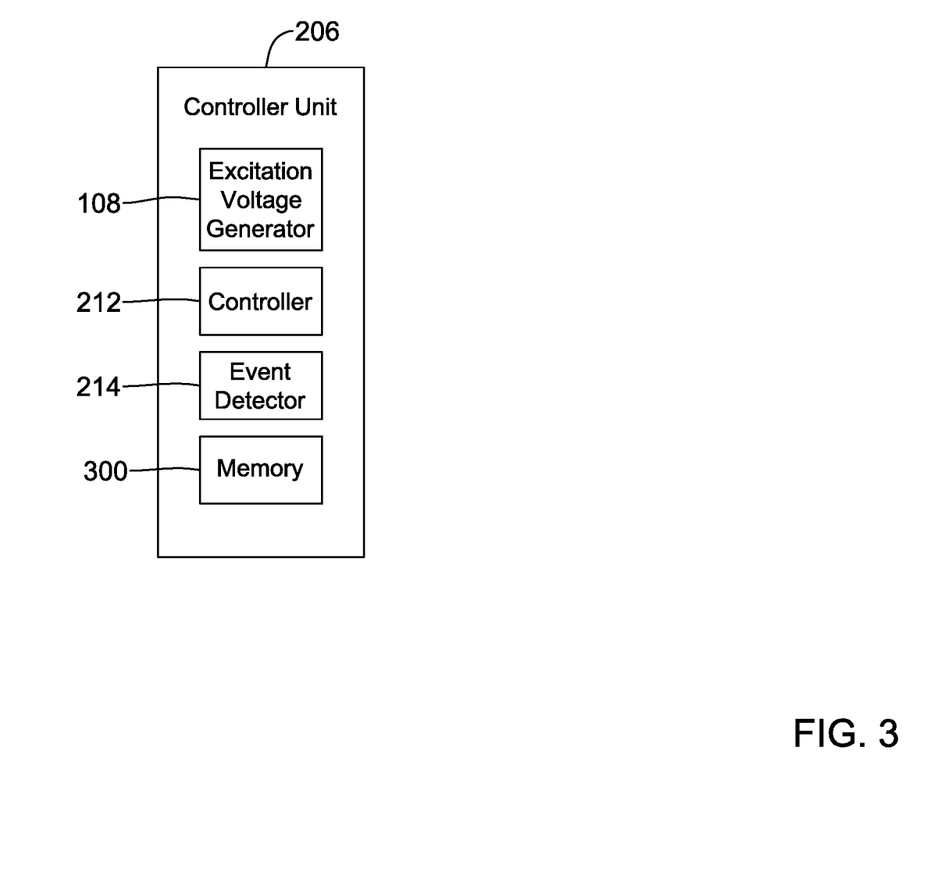
FIG. 3 is a schematic block diagram of an illustrative programmable controller unit.

FIG. 3 is a schematic block diagram of an illustrative controller unit 206. In some instances, the controller unit 206 may include the excitation voltage generator 108, the controller 212, the event detector 214, a memory 300, and/or any other suitable component as desired. As discussed above, the controller unit 206 may be coupled to and control a UV sensor (e.g., UV sensor 100). The excitation voltage generator 108 may apply an excitation voltage to the UV sensor in order to activate the UV detector and detect UV light emitted by a flame (e.g., flame 202) of a combustion appliance. The UV sensor 100 may have a UV sensitivity that reflects the intensity of UV light needed for the UV sensor 100 to detect a given UV emission (e.g. incident UV light required to trigger a conduction/detected event of the UV sensor). The actual UV sensitivity of a particular UV sensor 100 may be dependent on a number of factors including, for example, impurities in the electrodes of the UV sensor, corrosion of the electrodes, the leakage of gas from the gas filled chamber of the UV sensor, the amount of time the UV sensor has been in operation, the cumulative number of conduction events experienced by the UV sensor, the operating temperature experienced by the UV sensor, the number and/or severity of voltage and/or current spikes experienced by the UV sensor, and/or other factors.

The memory 300 can be any type of storage medium that can be accessed by the controller 212 to perform various examples of the present disclosure. For example, the memory 300 can be a non-transitory computer readable medium having computer readable instructions (e.g., computer program instructions) stored thereon that are executable by the controller 212. The memory 300 can be volatile or nonvolatile memory. The memory 300 can be removable (e.g., portable) memory, or non-removable (e.g., internal) memory. The memory 300 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory. Further, although the memory 300 is illustrated as being located within the controller unit 206, examples of the present disclosure are not so limited. For instance, the memory 300 can be located internal to another computing resource (e.g., enabling computer readable instructions to be downloaded over the Internet or another wired or wireless connection).

Figure 4:
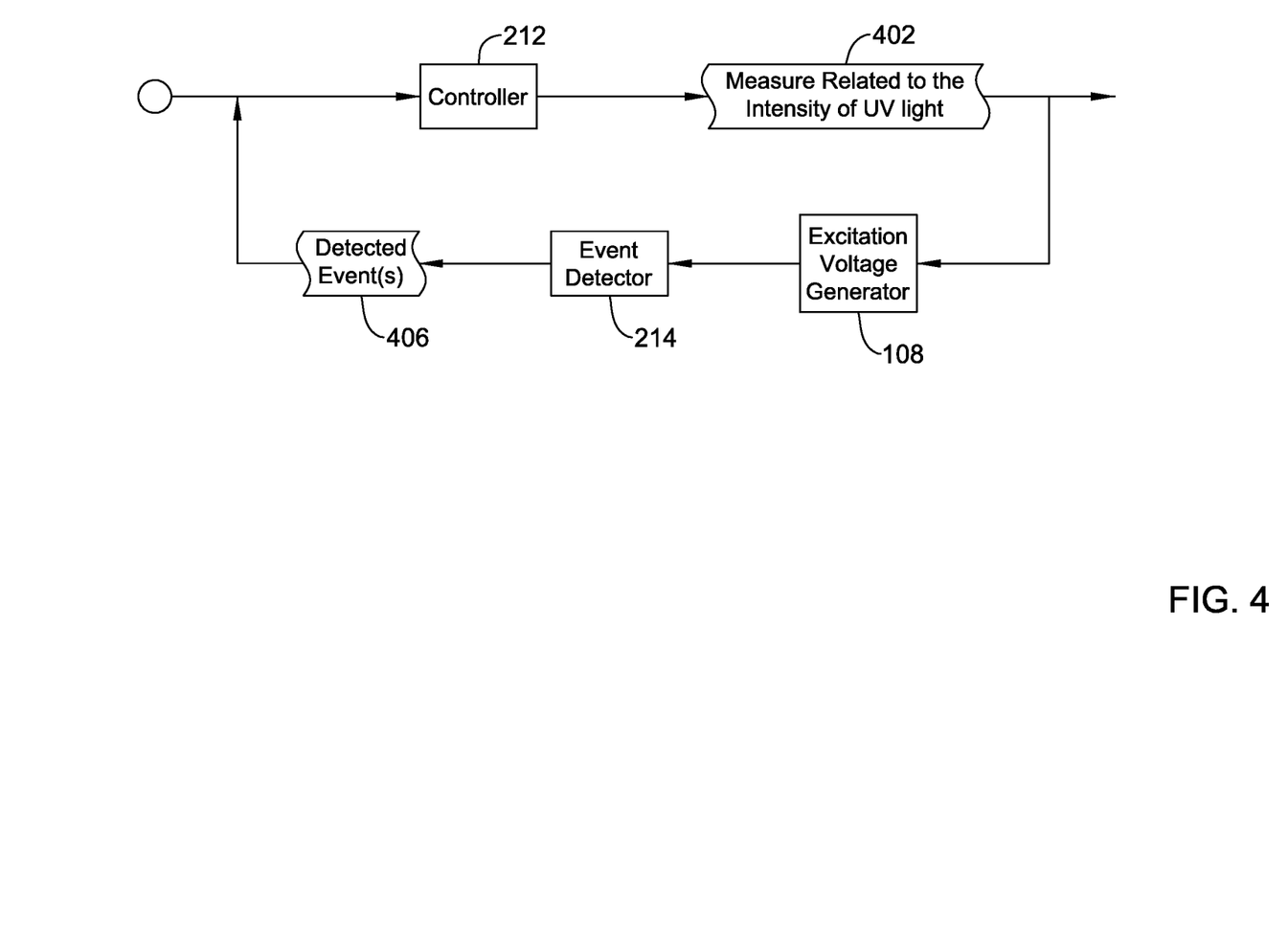
FIG. 4 is a flow diagram showing an illustrating operation of the controller unit.

FIG. 4 depicts a feed-back control system 400 to illustrate an illustrative operation of the controller unit 206 of FIG. 3. FIG. 4 will be described in conjunction with FIGS. 5-8. In some cases, the controller 212 may be responsible for providing a measure related to an intensity of UV light 402 to a burner management system (e.g., burner management system 208, from FIG. 2). The measure related to the intensity of UV light 402 may have several indications. For instance, the measure related to the intensity of UV light 402 may indicate that a flame is present in the burner or not. The measure related to the intensity of UV light 402 may also indicate that when a flame is present, whether the flame is strong, adequate, and/or weak. Moreover, the measure related to the intensity of UV light 402 may indicate that the operation of the UV sensor monitoring the flame is operating correctly, operating poorly (e.g., the UV sensor is old/worn out and/or damaged), and/or is non-operational. This and other information may be used by the burner management system or a technician(s) monitoring the burner management system to take action to correct/prevent further issues.

In some instances, the burner management system may have a safety controller programmed with a time-limit or measurement period that the burner management system will wait to receive the measure related to the intensity of UV light 402 before turning off a gas valve(s) and/or shutting down the burner. In some cases, the inability of the controller 212 to provide the measure related to the intensity of UV light 402 to the burner management system within the measurement period may indicate that the flame being monitored is either weak or extinguished (i.e., not present). As such, by shutting off the gas valve(s), the burner management system may prevent the buildup of fuel that may have occurred. In some cases, the measurement period may be 1 ms, 5 ms, 100 ms, 0.25 sec, 0.5 sec, 1 sec, 5 sec, 10 sec, etc.

In some cases, the control unit 206 may use the measure related to the intensity of UV light 402 to dynamically adjust a frequency or duty cycle at which the controller 212 causes the excitation voltage generator to produce an excitation voltage. In some cases, the control unit 206 may have a duty cycle saved in memory (e.g., memory 300, from FIG. 3). In some examples, the duty cycle may be a default duty cycle. In some cases, a user/technician may provide the control unit 206 with the duty cycle. In some instances, the duty cycle may be dynamically adjusted based at least in part on the determined intensity of the incoming UV radiation.

Figure 5:
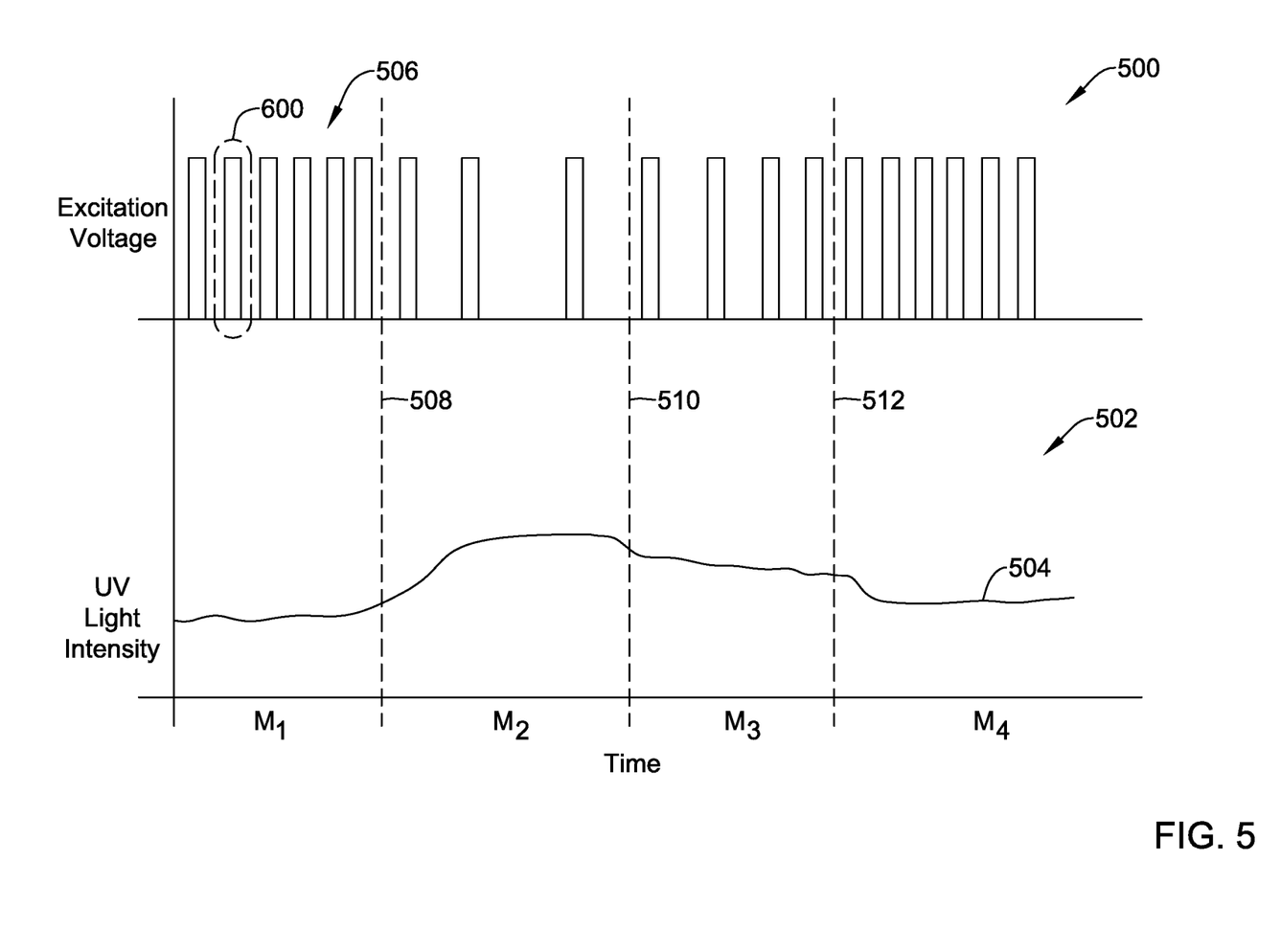
FIG. 5 is a timing diagram showing illustrative excitation voltage sample periods in response to changing UV light intensity over time.

FIG. 5 is a timing diagram 500 showing illustrative excitation voltage sample periods 600 in response to changing UV light intensity 502 over time. In the example shown, the timing diagram includes four measurement periods: M1, M2, M3, and M4. The measurement periods M1, M2, M3, and M4 may be greater than 0.5 second, 1 second, 5 seconds, 10 second, 60 second or any other suitable time. The measurement periods M1, M2, M3, and M4 may be arbitrary or defined. In the example of FIG. 5, during M1, UV light intensity 504 is relatively low. Accordingly, the duty cycle of the excitation voltage 506 may be relatively high. That is, when the flame intensity is low such as during measurement period M1 and M4, it may be useful to operate the UV sensor more often to obtain sufficient UV detection events to reach a desired confidence level in the UV sensor intensity reading compared to when the flame intensity is high, such as during measurement period M2.

In the example shown in FIG. 5, although the duty cycle is relatively high in period M1, the cumulative excitation time may still be less than 50% of the of the total time of period M1. In some cases, the cumulative excitation time may less than 50%, 45%, 40%, 35%, 30%, 25%, 20%, 15%, 10%, 5%, 1%, or less. As discussed above, the cumulative excitation time may be the sum total time during which the controller 212 causes the excitation voltage generator 108 to produce an excitation voltage sufficient for the UV sensor to detect UV light. The excitation voltage 506 may be, for example, between 0 and 12 volts DC, between 2 and 6 volts DC, between 3 and 5 volts DC, upwards of 100 volts or 300 volts or more, or any other suitable voltage. As shown in FIG. 4, when the excitation voltage generator 108 is producing the excitation voltage 506 the event detector 214 is capable of sensing UV light and registering the sensed UV light as detected events 406.

Figure 6:
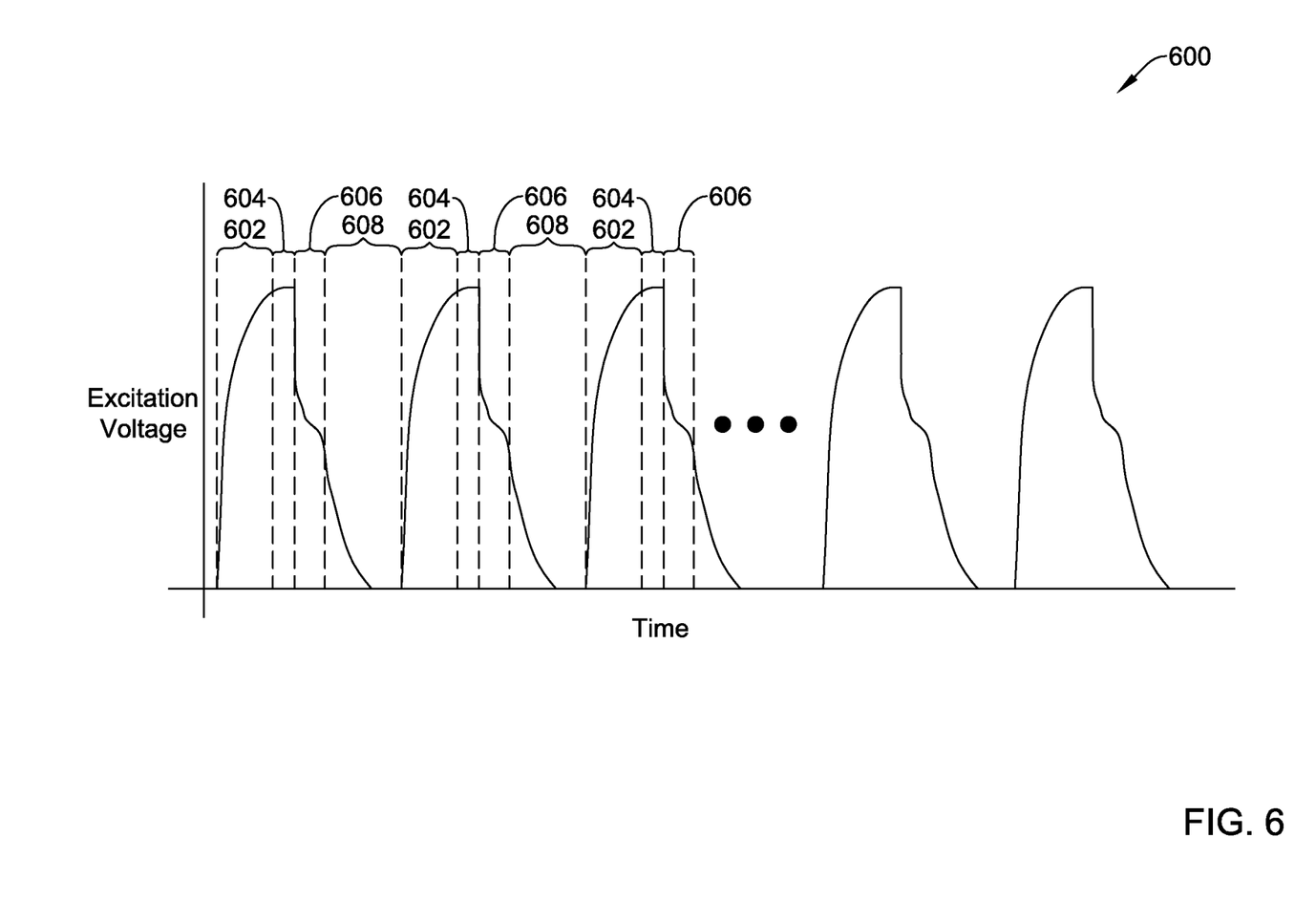
FIG. 6 is a timing diagram showing an illustrative excitation voltage sample period that includes quench times between detected events.

In some cases, after an emission of UV light has been sensed (event detected), the excitation voltage may be quenched briefly before the excitation voltage is again applied as described in U.S. Pat. No. 9,417,124, titled UTILIZING A QUENCH TIME TO DEIONIZE AN ULTRAVIOLET (UV) SENSOR TUBE, the disclosure of which is incorporated herein by reference. However, the "quench time" may still be considered part of a sample period 600 during where the voltage generator 108 produces an excitation voltage. For example, turning momentarily to FIG. 6, an individual excitation voltage sample period 600 of the excitation voltage sample periods 506 of FIG. 5 is depicted. As shown, a sample period 600 may include therein brief interruptions in the excitation voltage to quench the sensor between detected events. FIG. 6 shows illustrative phases that a UV sensor may go through when the UV sensor is excited by the excitation voltage and events are detected. In the example shown, a first phase 602 of the sample period 600 may be a charging phase. During the charging phase 602 a voltage provided to the UV sensor can increase to a threshold and/or the predetermined excitation voltage. A second phase 604 can be a holding, or an uncontrolled duration phase. The holding can include maintaining the excitation voltage to the UV sensor until a UV light/emissions is detected. A third phase 606 represents a detected UV emissions/event detection 406, where the event current causes a steep drop in the excitation voltage, which is sometimes called a natural quench. That is, during use, the UV sensor can detect a UV emission from a flame by detecting the naturally quench (e.g., deionization within the UV sensor tube). A fourth phase 608 can include a forced quench, which may be applied in accordance with U.S. Pat. No. 9,417,124 referenced above. That is, when the natural quench is not believed to adequately deionize the electrodes of the UV sensor, a forced quench can be applied. The forced quench can include full deionization within the UV sensor tube and a momentary excitation voltage of zero. The natural quench and the forced quench can prevent additional detection of conduction events 406 within the UV sensor for a predetermined period of time, i.e. until the excitation voltage is re-established. After the excitation voltage is re-established, the UV sensor may go through the above-referenced phases again. This may be repeated until the excitation voltage is no longer applied to the UV sensor, such as during a forced down time after the sample period 600 ends.

Turning back to FIG. 4, in some examples, the event detector 214 may send the detected events 406 to the controller 212. In some cases, the controller 212 may be programmed with a set of ranges or benchmarks that indicate the measure related to the intensity of the incoming UV radiation or the strength of the flame being monitored. For instance, the controller 212 may be programmed such that anywhere upwards of 80 events/ms indicates a strong flame, 60-80 events/ms indicates an adequate flame, 10-60 events/ms indicates a weak flame, and less than 10 events/ms indicates an extinguished flame. These are just examples. In some examples, the controller 212 may use the ranges to determine the measure related to the intensity of the incoming UV radiation and adjust the duty cycle of the excitation voltage accordingly.

Turning back to FIG. 5, and towards the end 508 of period M1, the UV light intensity 504 begins to increase. When this occurs, the duty cycle of the excitation voltage 506 may be reduced, as shown. In this example, as the duty cycle is reduced, the cumulative time that the excitation voltage is activate decreases as well, causing the UV sensor to be activated less often. Continuing with the example in FIG. 5, during period M2, the UV light intensity further increases, causing a further decrease in the duty cycle and thus the cumulative excitation voltage time. Towards the end 510 of period M2, the UV light intensity 504 begins to decrease, causing the duty cycle and cumulative excitation voltage time to increase. This causes the UV sensor to be activated more of the time. Throughout period M3, the UV light intensity gradually decreases, causing a further increase in the duty cycle and the cumulative excitation voltage time. During period M4, the UV light intensity further decreases to around the level it was during period M1. The duty cycle and the cumulative excitation voltage time further increase to around the level they were at during period M1.

In some cases, and turning back to FIG. 4, the controller 212 may be programmed with a threshold number of detected events. When so provided, the controller 212 may activate the excitation voltage during an excitation voltage sample period, sometimes containing intermittent quench times. The excitation voltage sample period may continue until the number of detected events counted by the controller 212 exceeds the threshold number of detected events. Once the number of detected events counted by the controller 212 exceeds the threshold number of detected events, the controller 212 may enforce a "down time" where the controller 212 controls the excitation voltage generator to discontinue producing an excitation voltage for the UV sensor. In some cases, the controller 212 may also track how long it took to reach the threshold number of detected events, such as via a timer. This time may be indicative of the intensity of the incoming UV light 402, and may be provided to the burner management system. In some cases, the controller 212 may use the indication of the intensity of the incoming UV light 402 to adjust the length of the down time following the excitation voltage sample period before the controller 212 again activates the excitation voltage during a subsequent excitation voltage sample period.

Figure 7:
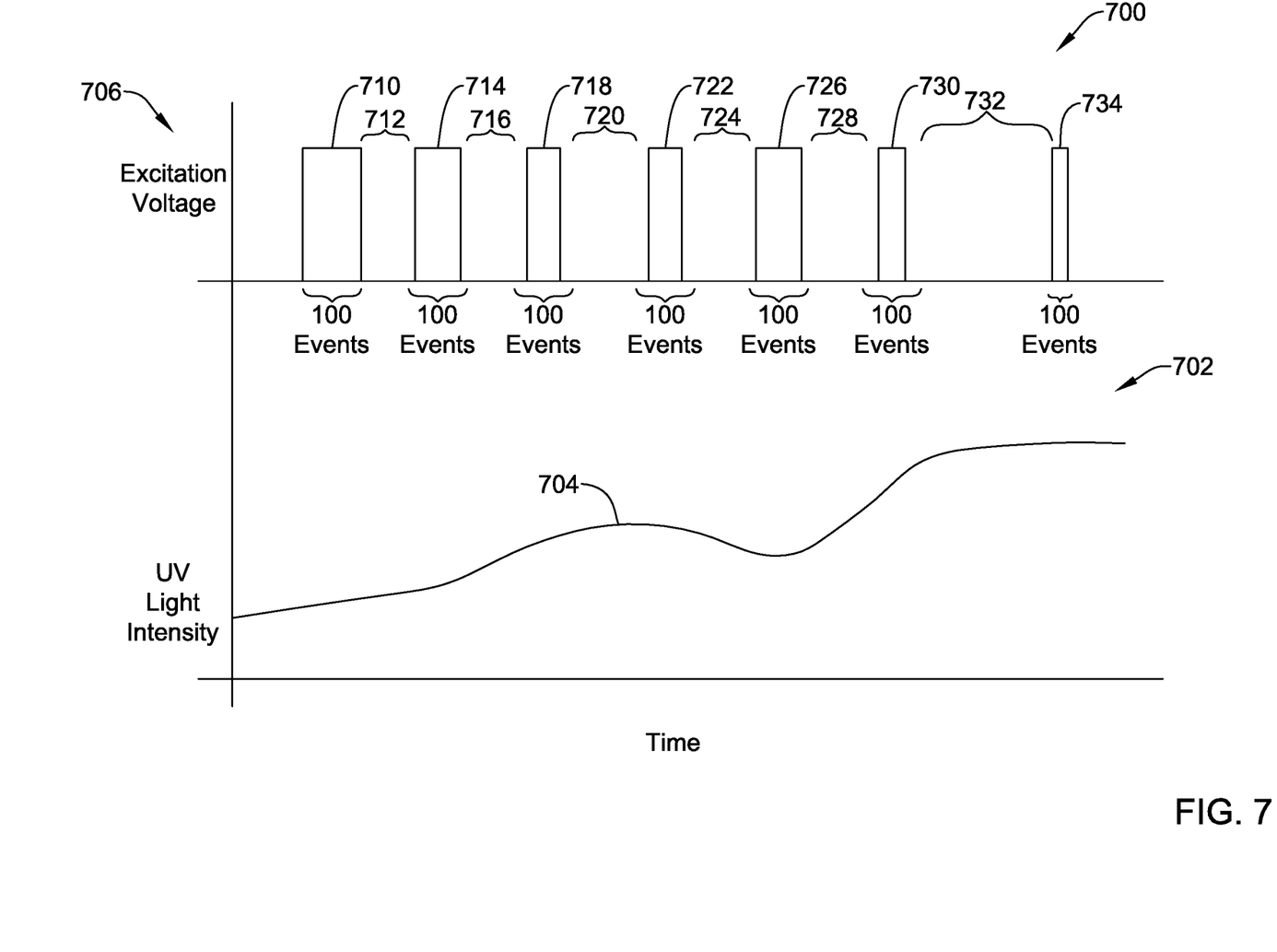
FIG. 7 is a timing diagram showing illustrative excitation voltage sampled periods in response to changing UV light intensity over time.

FIG. 7 is a timing diagram showing such an approach. In this example, the controller 212 may be programmed with a 100 event threshold. Initially, UV light intensity 704 is relatively low. Accordingly, the time it takes to detect 100 events 710 is relatively long. Once the 100 events 710 have been counted, a down time 712 may be enforced, where the excitation voltage 706 is removed. The length of the down time 712 may be based on how long it took to count the 100 events 710. In this instance, since the time it took to count the 100 events 710 was relatively long, the down time 712 may be relatively short as shown. When the down time 712 has ended, the UV sensor may again be excited by the excitation voltage (in some cases with intermittent quench times) until another 100 events have been counted by the controller 212. As shown, the UV light intensity 704 slightly increases. As such, it now takes less time for 100 events 714 to be counted than the time it took for 100 events 710 to be counted. Once 100 events 714 have been counted, a down time 716 may be enforced. The length of the down time 716 may be based on how long it took to count the 100 events 714. In this instance, since it took less time to count the 100 events 714, the down time 716 may be longer than the down time 712. When the down time 716 has ended, the UV sensor may again be excited by the excitation voltage (in some cases with intermittent quench times) until another 100 events have been counted by the controller 212. As shown, the UV light intensity 704 increased further. As such, it now takes less time for 100 events 718 to be counted than the time it took for 100 events 714 to be counted. Once 100 events 718 have been counted, a down time 720 may be enforced. The length of the down time 720 may be based on how long it took to count the 100 events 718. In this instance, since it took less time to count the 100 events 718, the down time 720 may be longer than the down time 716. This may continue as shown in FIG. 7. As can be seen, the amount of time that the excitation voltage is applied to the UV sensor is dynamically changed based on the UV light intensity 704.

In some cases, although the time it takes to count the predetermined number of detected events for each sample period (e.g., sample periods 710, 714, 718, 722, 726, 730, and 734) may indicate that the intensity of the incoming UV light 704 is good and the flame that is monitored is strong or adequate, drastic changes or differences between sample periods close in time may indicate issues with the flame, the burner, the burner management system, or the UV sensor. For example, the controller unit 206 may operate as described and continually count the 100 events. Accordingly, when the time it takes to count the 100 events is relative short for each sample period, the flame may be considered strong. However, a relatively drastic change between sample periods, such as between sample period 722 and sample period 726 for example, may indicate that there is an issue, and the burner management system or a technician(s) monitoring the burner management system may be notified so that any necessary actions may be taken.

Turning back to FIG. 4, in another example, the controller 212 may be programmed with a predetermined time period for which the detected events will be counted. In this example, the event detector 214 may send the detected events to the controller 212 and the controller 212 may count the detected events until a predetermined time period expires. Once the predetermined time period expires, the controller 212 may enforce a "down time" where the controller 212 controls the excitation voltage generator 108 to remove the excitation voltage from the UV sensor. The controller 212 may use the number of detected events counted during the predetermined time period to determine a measure of intensity of the incoming UV light 402, which may be reported to the burner management system. The controller 212 may also use the number of events counted during a particular sample period to adjust a length of the down time following the particular sample period.

Figure 8:
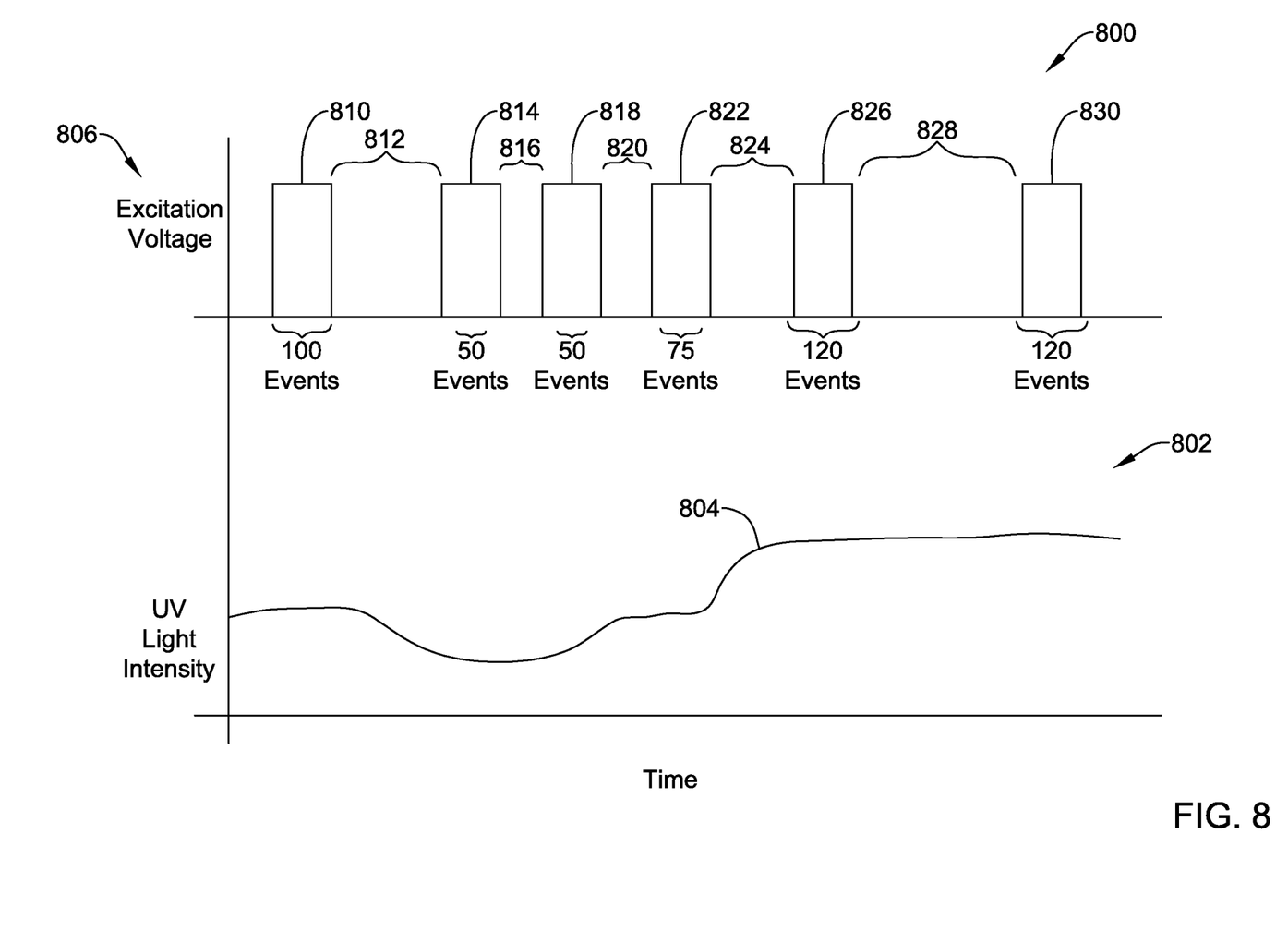
FIG. 8 is a timing diagram showing illustrative excitation voltage sampled periods in response to changing UV light intensity over time.

FIG. 8 is a timing diagram showing such an approach. In this example, the controller 212 may be programmed with a predetermined sample time period of 1 ms, although this is just an example. Initially, the UV light intensity 804 is relatively moderate. Accordingly, and in this example, 100 events 810 are counted in the 1 ms sample period. Once 1 ms has been reached, a down time 812 may be enforced where an excitation voltage 806 is removed from the UV sensor. In some cases, the length of the down time 812 may be determined based on how many events were counted in the 1 ms sample period. For example, since 100 events were counted (moderate) in the 1 ms sample period 810, the down time 812 may be relatively moderate. When the down time 812 has ended, the UV sensor may be excited by the excitation voltage and events may again be counted for another 1 ms sample period. As shown, the UV light intensity 804 has decreased. As such, in this example, only 50 events 814 are counted in the 1 ms sample period 814. Once 1 ms has been reached, a down time 816 may be enforced. Also, the length of the down time 816 may be determined based on how many events were counted in 1 ms sample period 814. In this instance, since 50 events were counted, the down time 816 may be reduced relative to the down time 812. When the down time 816 has ended, the UV sensor may be excited by the excitation voltage and events may be counted for another 1 ms sample period 818. As shown, the UV light intensity 804 remains relatively constant during this period. In this example, 55 events 818 are counted in the 1 ms sample period 818. Once 1 ms has been reached, a down time 820 may be enforced. Also, the length of the down time 820 may be determined based on how many events were counted in the 1 ms sample period 818. In this instance, since 55 events were counted, the down time 820 may be similar to the down time 816 as shown. When the down time 820 has ended, the UV sensor may be excited by the excitation voltage and events may be counted for another 1 ms sample period 822. As shown, the UV light intensity 804 has increased. As such, in this example, 75 events 822 are counted in the 1 ms sample period 822. Once 1 ms has been reached, a down time 824 may be enforced. Also, the length of the down time 824 may be determined based on how many events were counted in the 1 ms sample period 822. In this instance, since 75 events were counted, the down time 824 may be increased relative to down time 820. This may continue as shown in FIG. 8. As can be seen, the amount of time between the sample periods, and thus the cumulative amount of time that the excitation voltage is applied to the UV sensor, is dynamically changed based on the UV light intensity 804.

The examples described herein are by no means exhaustive. In some cases, the controller 206 may be configured in a different way such that it is capable of dynamically adjusting the excitation voltage while maintaining an sufficiently accurate measurement related to the intensity of the incoming UV light. As such, the final design may be optimized and tailored for specific systems and users. Moreover, examples of the controller 206 described herein may be capable of decreasing the amount of time that an excitation voltage is applied to a UV sensor may be reduced by a factor of 10 to 30 times or more from a UV sensor that uses an always on excitation voltage or even an always on excitation voltage that includes quench times between detected events. This may significant increase the operational lifetime and/or reliability of a UV sensor.

Figure 9:
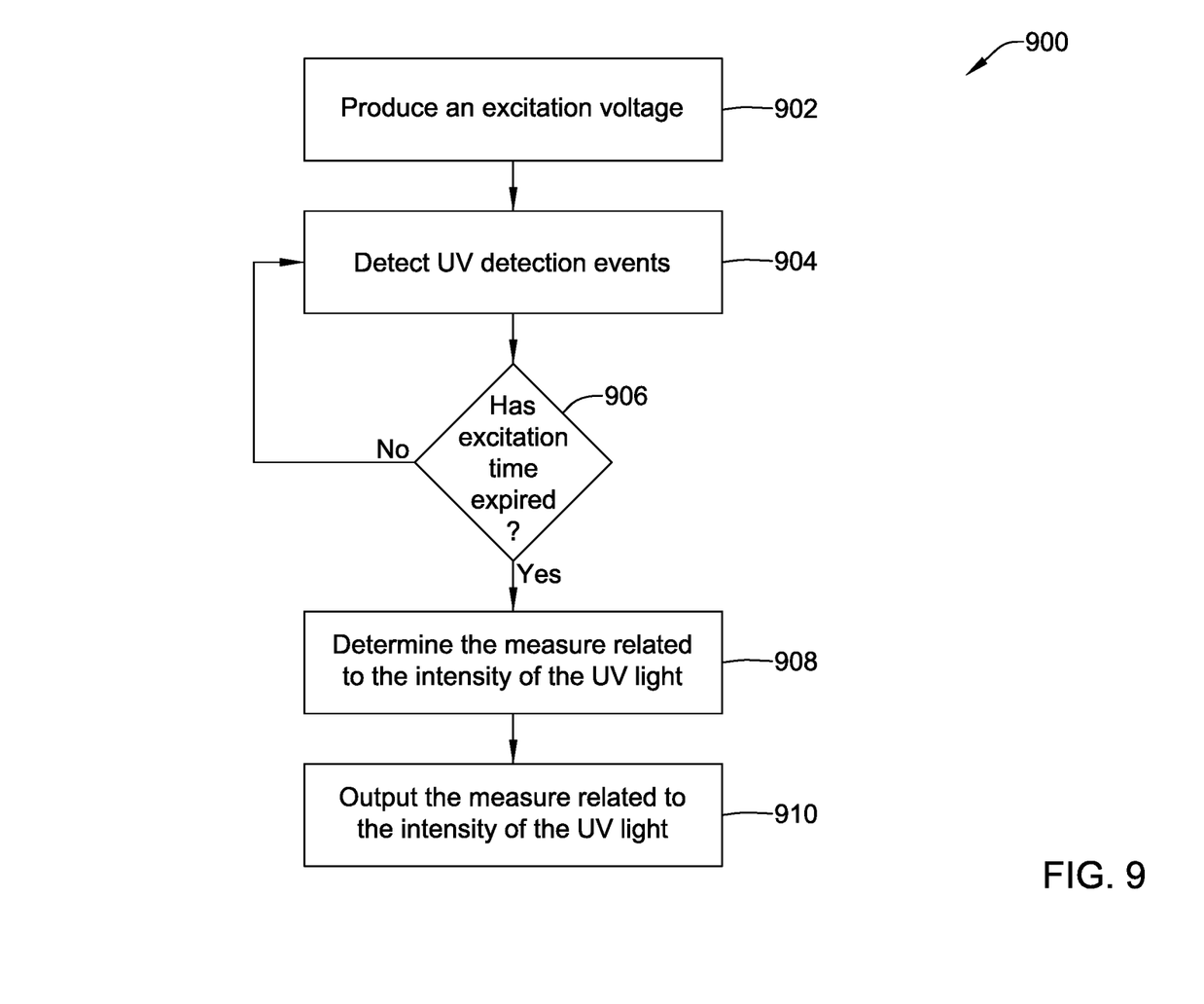
FIG. 9 is a flow chart showing an illustrative method of operating a UV sensor.

FIG. 9 is a flow chart showing an illustrative method 900 of operating a UV sensor. In some cases, the UV sensor may be excited by an excitation voltage that enables the UV sensor to detect incoming UV light. In some instances, the UV sensor may provide a plurality of detection events, and the rate of the number of the UV detection events may be proportional to the intensity of the incoming UV light. The method 900 begins at step 902 where an excitation voltage is produced. In some cases, the excitation voltage is produced for a cumulative excitation time that is less than the 50% of the time, sometimes less than the 50% of the total time over at least 1 second. In some cases, the cumulative excitation time may be less than 80%, 70%, 60%, 40%, 30%, 20%, 10%, 5% of the time. In some examples, the total time may be 1 ms, 5 ms, 100 ms, 0.25 sec, 0.5 sec, 1 sec, 5 sec, 10 sec, or any other suitable time.

At step 904, UV detection events are detected when the excitation voltage is produced. At step 906, it is determined if the excitation time has expired. In some cases, the excitation time expires when enough UV detection events have been detected to determine a measure related to the intensity of the incoming UV light. If it is determined that not enough UV detected events have been detected to determine the measure related to the intensity of the incoming UV light with a desired degree of accuracy, more UV detection events are detected at step 904. If it is determined that enough UV detected events have been detected to determine the measure related to the intensity of the incoming UV light, at step 908, the measure related to the intensity of the incoming UV light is determined. At step 910, the measure related to the intensity of the incoming UV light is then output.

Figure 10:
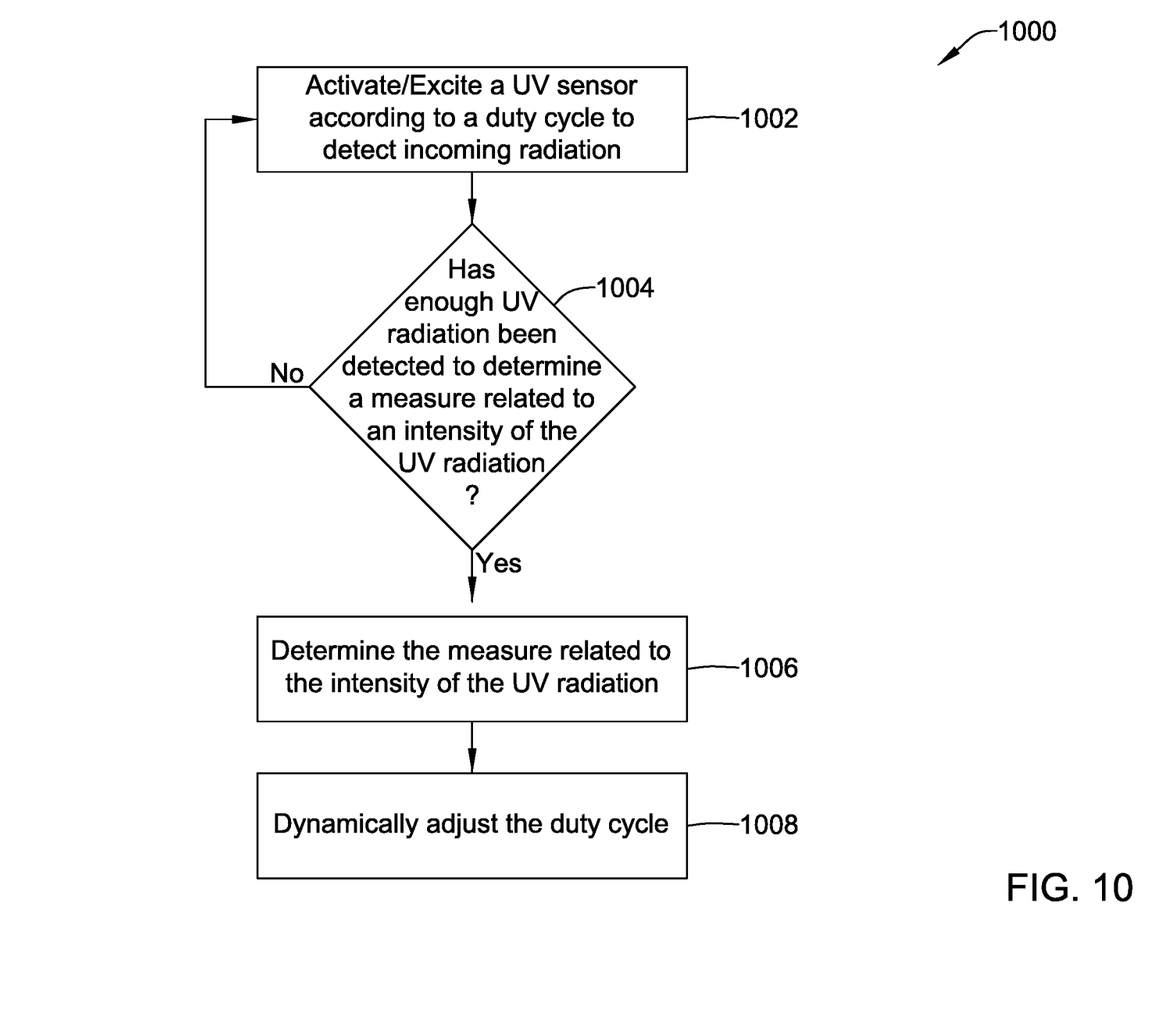
FIG. 10 is a flow chart showing another illustrative method of operating a UV sensor.

FIG. 10 is a flow chart showing another illustrative method 1000 of operating a UV sensor. The illustrative method 1000 begins at step 1002, where the UV sensor is activated in accordance with a duty cycle to detect incoming UV radiation during each cycle of the duty cycle. In one example, the cumulative excitation time because of the duty cycle is less than 70% of the overall time, sometimes less than the 70% of the total time over at least one second. In some cases, the cumulative excitation time may be less than 60%, 50%, 40%, 30%, 20%, 10%, 5% of the time. In some examples, the total time may be 1 ms, 5 ms, 100 ms, 0.25 sec, 0.5 sec, 1 sec, 5 sec, 10 sec, or any other suitable time.

At step 1004, it is determined if enough UV radiation has been detected to determine a measure related to the intensity of the incoming UV radiation with a desired degree of accuracy. If it is determined that not enough UV radiation has been detected to determine the measure related to the intensity of the incoming UV radiation, more UV radiation is detected at step 1002. If it is determined that enough UV radiation has been detected to determine the measure related to the intensity of the incoming UV radiation, at step 1006, the measure related to the intensity of the incoming UV radiation is determined. At step 1008, the duty cycle is dynamically adjusted based at least in part on the determined intensity of the incoming UV radiation.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A controller unit for controlling an ultraviolet (UV) sensor, wherein the UV sensor is excited by an excitation voltage that enables the UV sensor to detect incoming UV light, the UV sensor providing a plurality of UV detection events, a rate of the number of UV detection events being related to the intensity of the incoming UV light, the control unit comprising:

an excitation voltage generator configured to selectively produce the excitation voltage;

an event detector for detecting UV detection events when the excitation voltage generator is producing the excitation voltage;

a controller operatively coupled to the excitation voltage generator and the event detector, the controller configured to:

cause the excitation voltage generator to produce an excitation voltage for a cumulative excitation time that is less than 50% of the total time over at least 1 second;

determine a measure related to the intensity of the incoming UV light based on the UV detection events detected by the event detector when the excitation voltage is producing the excitation voltage; and output the measure related to the intensity of the incoming UV light.

2. The controller of claim 1, wherein the controller is configured to cause the excitation voltage generator to produce the excitation voltage for a cumulative excitation time that is less than 30% of the total time over at least 1 second.

3. The controller of claim 1, wherein the controller is configured to cause the excitation voltage generator to produce the excitation voltage for a cumulative excitation time that is less than 10% of the total time over at least 1 second.

4. The controller of claim 1, wherein the controller is configured to cause the excitation voltage generator to produce the excitation voltage for a cumulative excitation time that is less than 5% of the total time over at least one second.

5. The controller of claim 1, wherein the controller is configured to cause the excitation voltage generator to produce the excitation voltage for a cumulative excitation time that is based on the intensity of the incoming UV light.

6. The controller of claim 5, wherein the controller is configured to cause the excitation voltage generator to produce the excitation voltage for a cumulative excitation time that is longer when the intensity of the incoming UV light is lower than when the intensity of the incoming UV light is higher.

7. The controller of claim 1, wherein the controller is configured to:
count a predetermined number of the UV detection events detected by the event detector, wherein the predetermined number is greater than one;
determine how long it took to count the predetermined number of the UV detection events; and
after the predetermined number of the UV detection events have been counted, enforce a down time where the excitation voltage generator does not produce an excitation voltage sufficient to detect incoming UV light.

8. The controller of claim 1, wherein the controller is configured to repeat a plurality of times:
count a predetermined number of the UV detection events detected by the event detector, wherein the predetermined number is greater than one;
determine how long it took to count the predetermined number of the UV detection events; and
after the predetermined number of the UV detection events have been counted, enforce a down time where the excitation voltage generator does not produce an excitation voltage sufficient to detect incoming UV light.

9. The controller of claim 1, wherein the controller is configured to:
count the UV detection events detected by the event detector over a period of time; and
after the predetermined time expires, enforce a down time where the excitation voltage generator does not produce an excitation voltage sufficient to detect incoming UV light.

10. The controller of claim 1, wherein the controller is configured to repeat a plurality of times:
count the UV detection events detected by the event detector over a predetermined time; and
after the predetermined time expires, enforce a down time where the excitation voltage generator does not produce an excitation voltage sufficient to detect incoming UV light.

11. A method for controlling an ultraviolet (UV) sensor, wherein the UV sensor is excited by an excitation voltage that enables the UV sensor to detect incoming UV light, the UV sensor providing a plurality of UV detection events, a rate of the number of UV detection events being related to the intensity of the incoming UV light, the method comprising:
producing an excitation voltage for a cumulative excitation time that is less than 30% of the total time over at least 0.5 second;
detecting UV detection events when the excitation voltage is produced;
determining a measure related to the intensity of the incoming UV light based on the UV detection events; and
outputting the measure related to the intensity of the incoming UV light.

12. The method of claim 11, wherein the excitation voltage is produced for a cumulative excitation time that is less than 10% of the total time over at least 0.5 seconds.

13. The method of claim 11, wherein the excitation voltage is produced for a cumulative excitation time that is based at least in part on the intensity of the incoming UV light.

14. The method of claim 13, wherein the excitation voltage is produced for a cumulative excitation time that is longer when the intensity of the incoming UV light is lower than when the intensity of the incoming UV light is higher.

15. The method of claim 11, further comprising:
counting a predetermined number of the UV detection events, wherein the predetermined number is greater than one;
determining how long it took to count the predetermined number of the UV detection events; and
after the predetermined number of the UV detection events have been counted, enforcing a down time where an excitation voltage sufficient to detect incoming UV light is not produced.

16. The method of claim 11, further comprising repeating a plurality of times:
counting a predetermined number of the UV detection events, wherein the predetermined number is greater than one;
determining how long it took to count the predetermined number of the UV detection events; and
after the predetermined number of the UV detection events have been counted, enforcing a down time where an excitation voltage sufficient to detect incoming UV light is not produced.

17. The method of claim 11, further comprising:
counting the UV detection events over a predetermined time; and
after the predetermined time expires, enforcing a down time where an excitation voltage sufficient to detect incoming UV light is not produced.

18. The method of claim 11, further comprising repeating a plurality of times:
counting the UV detection events over a predetermined time; and
after the predetermined time expires, enforcing a down time where an excitation voltage sufficient to detect incoming UV light is not produced.

* * * * *